US009588996B2

(12) United States Patent
Chuang et al.

(10) Patent No.: US 9,588,996 B2
(45) Date of Patent: *Mar. 7, 2017

(54) POINT IN TIME RECOVERY SUPPORT FOR PENDING SCHEMA DEFINITION CHANGES

(71) Applicant: International Business Machines Corporation, Armonk, NY (US)

(72) Inventors: Szu-Huey Chuang, San Jose, CA (US); Craig A. Friske, Morgan Hill, CA (US); Laura M. Kunioka-Weis, Morgan Hill, CA (US); Regina J. Liu, San Jose, CA (US); Ka C. Ng, San Francisco, CA (US); James Z. Teng, San Jose, CA (US); Binghui Zhong, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 50 days.

This patent is subject to a terminal disclaimer.

(21) Appl. No.: 14/634,065

(22) Filed: Feb. 27, 2015

(65) Prior Publication Data

US 2015/0286532 A1    Oct. 8, 2015

Related U.S. Application Data

(63) Continuation of application No. 14/246,515, filed on Apr. 7, 2014.

(51) Int. Cl.
*G06F 17/30* (2006.01)
*G06F 11/14* (2006.01)

(52) U.S. Cl.
CPC .... *G06F 17/30292* (2013.01); *G06F 11/1448* (2013.01); *G06F 11/1451* (2013.01);
(Continued)

(58) Field of Classification Search
CPC combination set(s) only.
See application file for complete search history.

(56) References Cited

U.S. PATENT DOCUMENTS 6,125,370 A    9/2000  Courter et al.
6,732,123 B1   5/2004  Moore et al.
(Continued)

OTHER PUBLICATIONS

Alter Tablespace, available at : http://pic.dhe.ibm.com/infocenter/dzichelp/v2r2/index.jsp?topic=%2Fcom.ibm.db2z9.doc.sqlref%2Fsrc%2Ftpc%2Fdb2z_sql_altertablespace.htm. 13 pp.
(Continued)

*Primary Examiner* — Shyue Jiunn Hwa
(74) *Attorney, Agent, or Firm* — Mollborn Patents, Inc.; Fredrik Mollborn

(57) ABSTRACT

Recovering data to a point in time before pending definition changes are materialized in a relational database management system. One or more definition changes to a database schema are received. Original data base schema attributes are saved and maintained as point in time metadata in a catalog table until the one or more definition changes have been materialized. During recovery processing, it is determined for each object being recovered whether the object is being recovered to a point in time prior to which the one or more definition changes were materialized. In response to determining that an object is being recovered to a point in time prior to which the one or more definition changes were materialized, the saved point in time metadata is used for the object in the recovery process.

5 Claims, 3 Drawing Sheets

(52) U.S. Cl.
CPC ...... *G06F 11/1469* (2013.01); *G06F 2201/80* (2013.01); *G06F 2201/84* (2013.01)

(56) References Cited

U.S. PATENT DOCUMENTS

| | | | |
|---|---|---|---|
| 7,769,718 B2 | 8/2010 | Murley et al. | |
| 8,200,665 B2 | 6/2012 | Beier et al. | |
| 8,291,191 B2 | 10/2012 | Barbarek et al. | |
| 8,364,648 B1 | 1/2013 | Sim-Tang | |
| 8,694,551 B2* | 4/2014 | Ramamurthy | G06F 17/30289 707/802 |
| 2011/0258634 A1* | 10/2011 | Bonilla | G06F 9/505 718/105 |
| 2013/0018849 A1* | 1/2013 | Johnston | G06F 17/30309 707/687 |
| 2013/0117233 A1 | 5/2013 | Schreter | |

OTHER PUBLICATIONS

Josten, Jeff. REORG Tablespace. DB2 on 51390 availability features and challenges. IBM Information Management Software for z/OS Solutions Information Center, available at : http://pic.dhe.ibm.com/infocenter/dzichelp / v2r2/index. jsp?topic=% 2Fcom.ibm.db2z10.doc.ugref%2Fsrc%2Ftpc%2Fdb2z_utl_reorgtablespace.htm. Oct. 15, 2011. 32 pp.

List of IBM Patents or Patent Applications Treated as Related.

* cited by examiner

POINT IN TIME RECOVERY SUPPORT FOR PENDING SCHEMA DEFINITION CHANGES

BACKGROUND

The present invention relates to database management systems, and more specifically, to recovery of data in Relational Database Management System to a point in time before the object's schema definition was changed or modified. A relational database can be generally described as a collection of data items organized as a set of formally described tables from which data can be accessed easily. The software used in a relational database is typically referred to as a Relational Database Management System (RDBMS). One example of an RDBMS is the DB2, which is available from International Business Machines Corporation of Armonk, N.Y.

In some RDBMSs, such as the DB2, there is the concept of pending schema definition changes. Pending schema definition changes are only materialized and applied to both the metadata and data when a subsequent process that reorganizes the object's data is executed. One example of pending definition changes is ALTER statements relating to changes of various properties of table spaces (e.g., segment size, data set size, buffer pool page size, table space type, etc.).

Recovery to a point in time (PIT) prior to pending definition changes were materialized is not permitted in a RDBMS. There needs to be a way to allow such recovery on the data, because this restriction could otherwise cause the loss of data or the loss of availability to the data in a customer production environment. This includes, for example, scenarios when immediate ALTER statements were issued during a window between the subsequent processing which materialized pending definition changes and the point-in-time recovery processing.

SUMMARY

According to various embodiments of the present invention, techniques are provided for recovering data to a point in time before pending definition changes are materialized in a relational database management system. One or more definition changes to a database schema are received. Original data base schema attributes are saved and maintained as point in time metadata in a catalog table until the one or more definition changes have been materialized. During recovery processing, it is determined for each object being recovered whether the object is being recovered to a point in time prior to which the one or more definition changes were materialized. In response to determining that an object is being recovered to a point in time prior to which the one or more definition changes were materialized, the saved point in time metadata is used for the object in the recovery process.

The details of one or more embodiments of the invention are set forth in the accompanying drawings and the description below. Other features and advantages of the invention will be apparent from the description and drawings, and from the claims.

BRIEF DESCRIPTION OF THE SEVERAL VIEWS OF THE DRAWINGS

Like reference symbols in the various drawings indicate like elements.

DETAILED DESCRIPTION

The various embodiments of the invention described herein provide support for a user to recover data to a point in time (PIT) that is prior to a utility that materialized pending definition changes on a table space. This support also includes scenarios when immediate ALTER commands were issued during a window between the materializing utility processing and the PIT recovery processing. Similar recovery techniques can be applied to indexes along with their associated table space, or can also be applied on an index itself to recover data on the index to a PIT that is prior to a utility that materialized pending definition changes on the index. One significant advantage of this recovery concept is scalability, as the techniques in accordance with the various embodiments described herein work equally well for any number of objects being recovered.

In accordance with one embodiment, a RECOVER utility is used, followed by a REORG utility, which handles the format updates on the data. In some embodiments, the RECOVER utility recovers data to the current state or to a previous PIT by restoring a copy of the data and then applying log records to the restored copy. In other embodiments the RECOVER utility can recover data to a previous PIT by backing out committed work. The REORG utility reorganizes a table space or an index space to improve access performance and to reclaim fragmented space. The degree of access to the data during reorganization can be specified. The REORG utility can reorganize a single partition or a range of partitions of a partitioned table space, or reorganize a single partition of a partitioning index or of a data-partitioned secondary index.

By using the RECOVER utility, followed by the REORG utility, major code duplication can be avoided and scalability can be achieved. It should, however, be noted that this is merely one embodiment. In another embodiment, for example, the RECOVER utility can handle the entire process, including getting the recovered format to the current format so that the data will be converted to match the metadata. Thus, there are other techniques that fall within the scope of the claims and that can be envisioned by those of ordinary skill in the art.

During the recovery processing, the schema of the objects remains the same in the metadata while the data is recovered to a PIT that is prior to a utility that materialized pending definition changes. The table space is placed in a restrictive, REORG-pending (REORP), state at the end of the recovery processing to prevent any data access. Then a table space level REORG is performed to finalize the PIT recovery process, where the REORG brings the data in sync with the current schema and removes the REORG-pending (REORP) restrictive state at the end of REORG processing.

Figure 1:
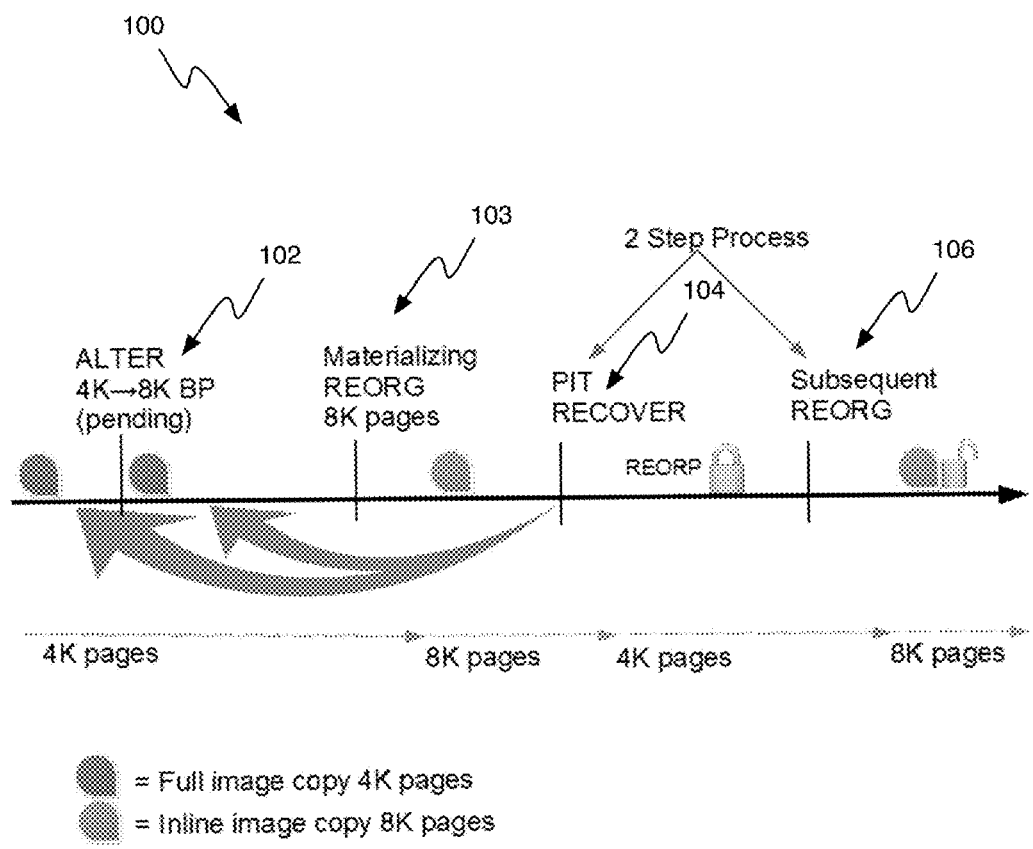
FIG. 1 shows a schematic example of recovery processing, in accordance with one embodiment.

FIG. 1 shows a schematic example of recovery processing (100), in accordance with one embodiment. Assume there was a pending definition change (102) to alter the table space buffer pool by changing the page size from 4 KB to 8 KB. Subsequently, PIT recovery (104) was issued on the table space to recover the data to a PIT that is prior to the REORG (103) that materialized the page size pending definition change. During the recovery processing, the data page size would be recovered back to 4 KB and remain so until the subsequent REORG completion (106) to bring the page size back to 8 KB.

In one embodiment, the recovery processing is realized by preserving the original schema attribute before the pending definition changes are materialized. This information, which will be referred to herein as "PIT metadata," is saved in a database system catalog table during the materializing utility processing. The PIT metadata matches the data recovered to a PIT that is prior to a utility that materialized pending definition changes. The PIT metadata is only required temporarily during the recovery processing and the subsequent REORG processing. If multiple pending definition changes on the same object were materialized by the same utility, the earliest set of PIT metadata before any of the pending definition changes were processed is preserved.

When immediate ALTER statements were issued in the window between the materializing utility processing and the point-in-time (PIT) recovery processing, certain attributes in the PIT metadata are transformed to inherit the attribute values from the current metadata during the construction phases of recovery processing and subsequent REORG processing.

The stored PIT metadata information is removed from the database system catalog table when the entries become obsolete while there is no recover base available, when the table is dropped for explicitly created tables spaces (e.g., large objects and XML), or when the table space itself is dropped to maintain the PIT metadata records up-to-date.

Figure 2:
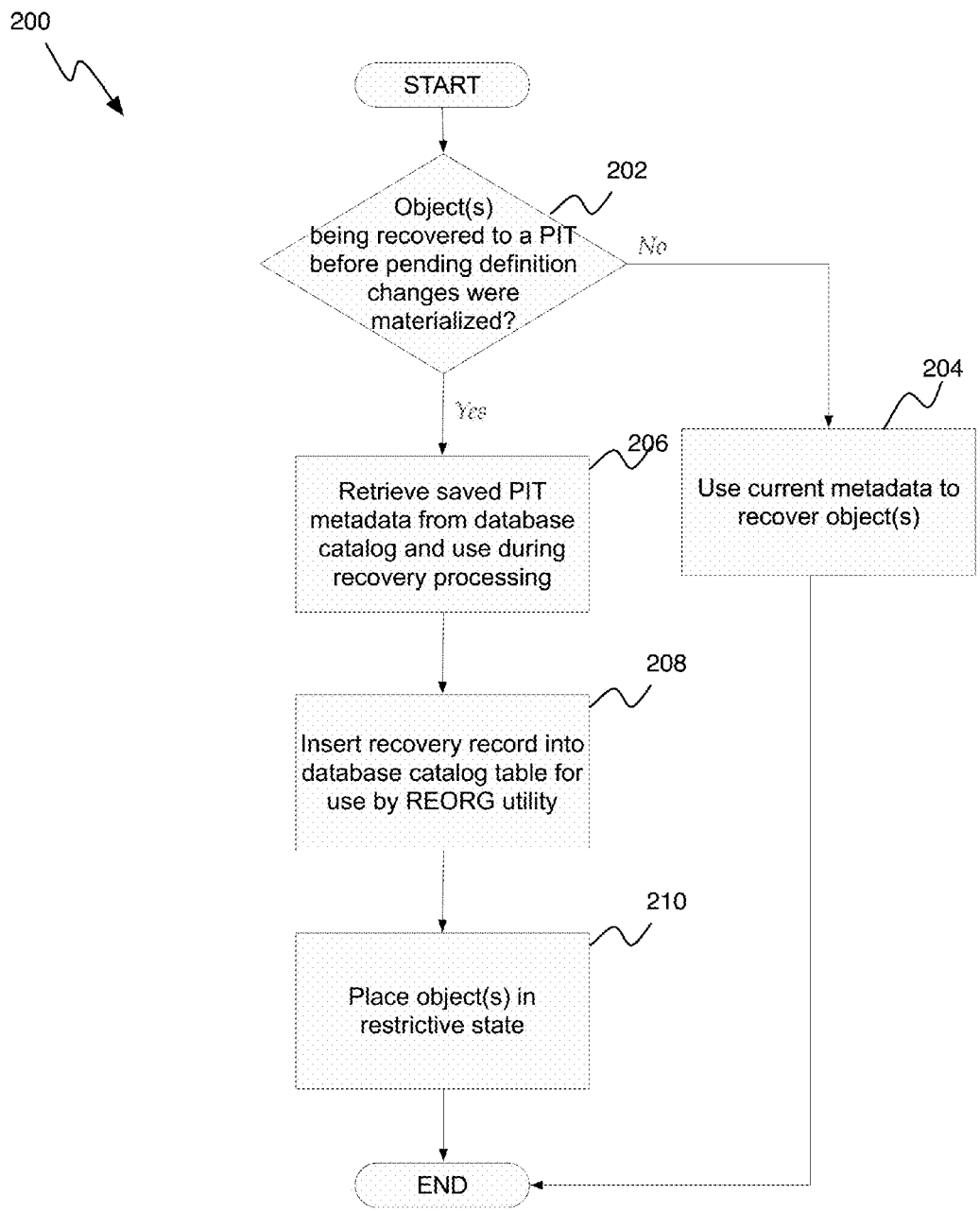
FIG. 2 shows a flowchart for PIT recovery processing to a point in time that is prior to a utility that materialized pending definition changes, in accordance with one embodiment.

FIG. 2 shows a flowchart for PIT recovery processing (200) to a point in time that is prior to a utility that materialized pending definition changes, in accordance with one embodiment. As can be seen in FIG. 2, the process (200) starts by determining for each object whether the object is being recovered to a PIT before pending definition changes were materialized (step 202). In one embodiment, this is done by interrogating the history of each object's metadata definition changes to the PIT metadata information that was saved in a database system catalog table. For objects that are not being recovered to a PIT before pending definition changes were materialized, the process continues to step 204, where current metadata is used to recover the affected objects, which ends the process (200).

For objects that need to be recovered to a PIT before pending definition changes were materialized, the PIT metadata that corresponds to an object's schema attributes at the recovery point is retrieved from the information saved in the database system catalog table (step 206). In one embodiment, the retrieved PIT metadata is used during:
  the delete and redefine of the underlying data sets for the object, so that the data sets are defined with the attributes at the recovery point;
  the open and close, extension, read and write of the object's underlying data sets;
  the restoration of the pages from the backup, and any manipulation of pages during recovery;
  the log processing, which applies the updates up to the recovery point, then backs out uncommitted activity to ensure transactional consistency;

After successful recovery processing, information is inserted into the database system catalog table as a special indicator for the subsequent REORG to finalize the PIT recovery process (step 208). Finally, the objects are placed in the REORG-pending (REORP) restrictive state (step 210) to prevent any data access until the REORG is executed, which ends the process (200).

It should be noted that during some portions of the recovery processing, the current metadata is used (for the affected objects) as it may be required by the underlying database system infrastructure. One example of such a situation is when the additional partitions have been ALTER added to the table space so that the number of partitions in the PIT metadata is different from the number of partitions in the current metadata. In this case, the number of partitions from the current metadata is used during the recovery processing.

Figure 3:
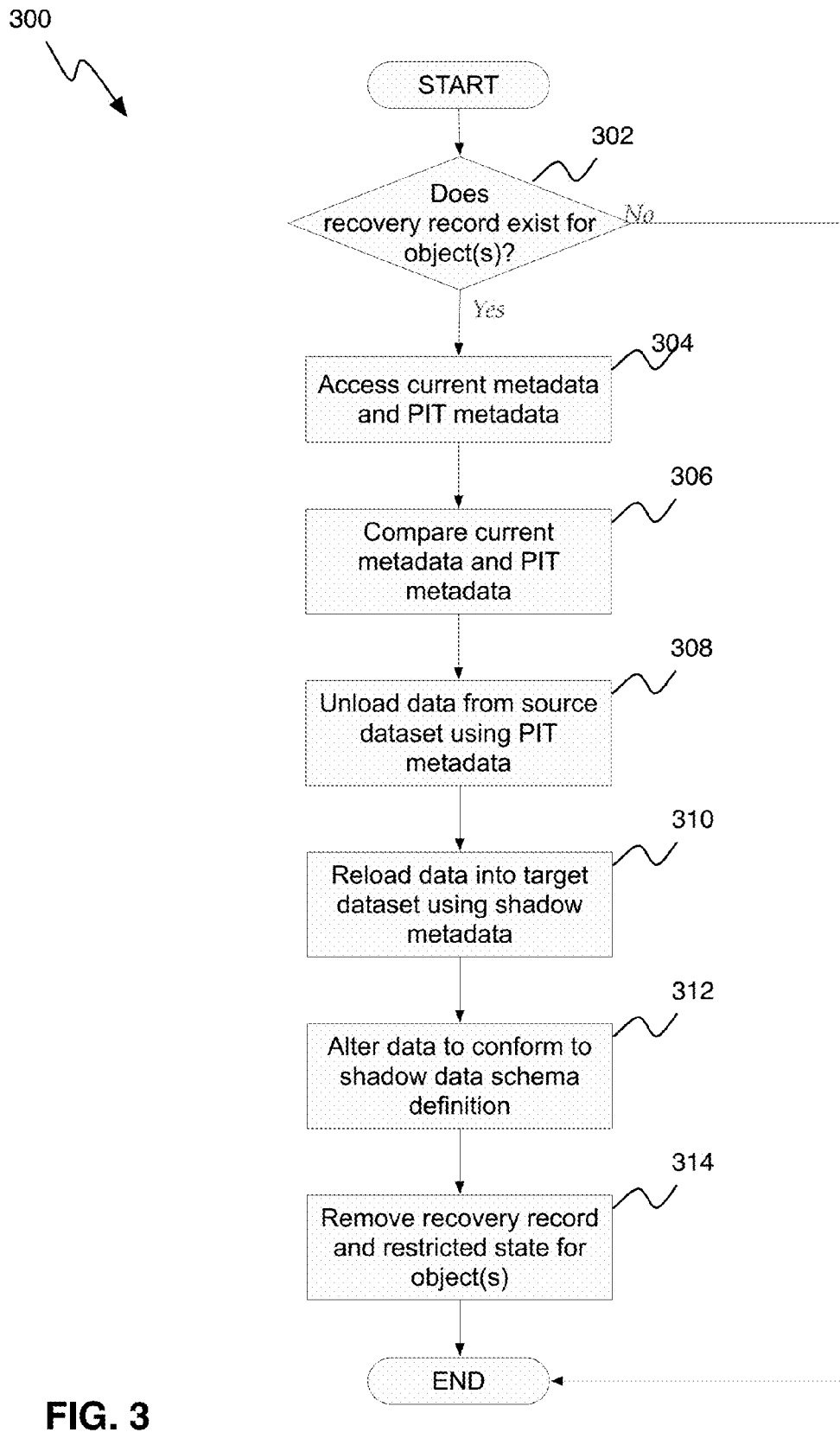
FIG. 3 shows a flowchart of the subsequent REORG process for finalizing the PIT recovery processing, in accordance with one embodiment.

FIG. 3 shows a flowchart of the subsequent REORG process (300) for finalizing the PIT recovery, in accordance with one embodiment. As can be seen in FIG. 3, the process (300) starts by checking whether a special recovery record exists in the database system catalog table (step 302). If no recovery record exists, then there is no need to perform the REORG process (300), the process ends and a conventional REORG process can be performed. However, if a recovery record is found, the current metadata and PIT metadata is accessed (step 304). The current metadata and the PIT metadata are then compared to determine what pending definition changes were applied on the object (step 306).

Next, data is unloaded from the source data set by the REORG utility, using the PIT metadata that contains the original schema attributes before pending definition changes were materialized (step 308). After the data has been unloaded, it is reloaded into a target data set by the REORG utility, using the metadata that contains all of the new schema attributes from the pending definition changes (step 310).

The data is then altered to conform to the schema definition reflected by the shadow metadata (step 312). At the end of successful subsequent REORG processing, the special recovery record is removed from the database system catalog table and the REORP restrictive state is also removed from the objects (step 314), which ends the process (300).

It should be noted that while recovering the data on the table space, the indexes are triggered to be rebuilt during the table space level subsequent REORG. Therefore, supporting recovery of data on an index to a PIT that is prior to a utility that materialized pending definition changes on an index can also be done, but is not necessary.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for recovering data to a point in time before pending definition changes are materialized in a relational database management system, comprising:

receiving one or more definition changes to a database schema;

saving and maintaining original data base schema attributes as point in time metadata in a catalog table until the one or more definition changes have been materialized;

during recovery processing, determining for each object being recovered whether the object is being recovered to a point in time prior to which the one or more definition changes were materialized;

in response to determining that an object is being recovered to the point in time prior to which the one or more definition changes were materialized, using the saved point in time metadata for the object in the recovery process; and in response to determining that an object is not being recovered to the point in time prior to which the one or more definition changes were materialized, using current metadata for the object in the recovery process.

2. The method of claim 1, further comprising:

in response to receiving multiple definition changes to the database schema, saving and maintaining the earliest database schema attributes as the point in time metadata.

3. The method of claim 1, further comprising:

placing the object in a restrictive state to prevent changes from occurring to the object;

applying changes resulting from the database schema definition changes to the object; and removing the restrictive state from the object.

4. The method of claim 1, wherein determining for each object being recovered whether the object is being recovered to the point in time prior to which the one or more definition changes were materialized includes:

comparing the history of each object's metadata definition changes with the saved point in time metadata.

5. The method of claim 1, wherein using the saved point in time metadata for the object in the recovery process includes using the saved point in time metadata for one or more of:

delete and redefine of underlying data sets for the object, open and close, extension, read and write of the object's underlying data sets, restoration of the pages from the backup, and manipulation of pages during recovery, and log processing.

* * * * *